United States Patent [19]
Cressman et al.

[11] 3,747,049
[45] July 17, 1973

[54] STRAIN RELIEF FOR ANGLE PLUG
[75] Inventors: Robert C. Cressman, East Greenwich; Luther M. Sheldon, Cranston, both of R.I.
[73] Assignee: General Electric Company, Providence, R.I.
[22] Filed: July 29, 1971
[21] Appl. No.: 167,389

[52] U.S. Cl............................. 339/107, 339/206 P
[51] Int. Cl................................................ H01r 13/58
[58] Field of Search...................... 339/103, 107, 99, 339/210, 202, 245, 208, 206

[56] References Cited
UNITED STATES PATENTS
3,335,395 8/1967 Smith................................. 339/107

FOREIGN PATENTS OR APPLICATIONS
251,676 5/1926 Great Britain.................. 339/103 R
1,046,704 10/1966 Great Britain.................. 339/103 M

*Primary Examiner*—Richard E. Moore
*Attorney*—Paul E. Rochford et al.

[57] ABSTRACT

A cable indexing angle cap is provided having a cable clamp and power blades extending generally at right angles to each other. Reinforcement of the cable grip is achieved by including a keyway in the side wall of the angle cap and closing the side wall opening with a keyed wall portion formed integrally with the lower member of the cable clamp.

1 Claim, 6 Drawing Figures

Inventors
Luther M. Sheldon
Robert C. Cressman
By Paul Rochford
Attorney

STRAIN RELIEF FOR ANGLE PLUG

The present invention relates to wiring devices and more particularly to caps in which a cord or cable is extended from the cap at an angle to the direction in which the blades extend from the cap. More specifically the invention relates to such caps having added strength for resisting strain developed between the cable and the blades.

Electric power plugs or caps are generally used in applications in which power blades extend in the direction of extension of the cable supplying power to the cap. This is usually in transfer of power from wall receptacles or from connectors or similar power sources, to and through the cable attached to the cap to some apparatus to be powered electrically. The angle cap is convenient with reference to wall receptacles because it may be inserted into the receptacle in the manner similar to the parallel cable cap but by use of the angle cap the cable may be positioned conveniently against the wall in which the receptable is mounted and thus awkward extension of the cable out from the wall is avoided. In other words it saves space, makes a neater safer mounting of a cap in a wall receptacle, presents a smooth outer surface so that it is not easily dislodged.

One feature which is sought in an angle cap is the capability to withstand stress or strain of handling as occurs when the cable which is attached to the cap is pulled or is turned so as to place a twisting force on the blades.

It is accordingly one object of the present invention to provide a cap which resists or withstands stress extending through the cap between the blades and the cable.

Another object is to provide a cap which can be readily assembled and disassembled for wiring and rewiring.

A further object is to provide an angle cap having a stronger insulating housing.

A still further object of the present invention is to provide an angle cap having a relatively low cost for the strength and other features provided.

Other objects and advantages of the present invention will be in part apparent and in part pointed out in the descrijtion which follows.

In one of its broader aspects the objects of the present invention may be achieved by an angle cap comprising a cover, a main portion of said cover being cup shaped and having an opening extending generally axially along a side wall of said cup, a cord grip visor extending outwardly from the wall portion above said opening, a generally cylindrical insulating body having power blades with wire connectors mounted in said body, said body being mounted in the well of the cup portion of said cover, the side opening of said cap having a keyway to receive a closure for said opening, a closure element adapted to slide axially in said keyway, said closure having a clamp element extending generally at right angles to said closure, and screw means extending between and threaded into said clamp elements to exert clamping pressure on a cable between said clamping members.

The manner in which the invention may best be carried out will be made clearer by references to the accompanying drawings in which.

Figure 6:
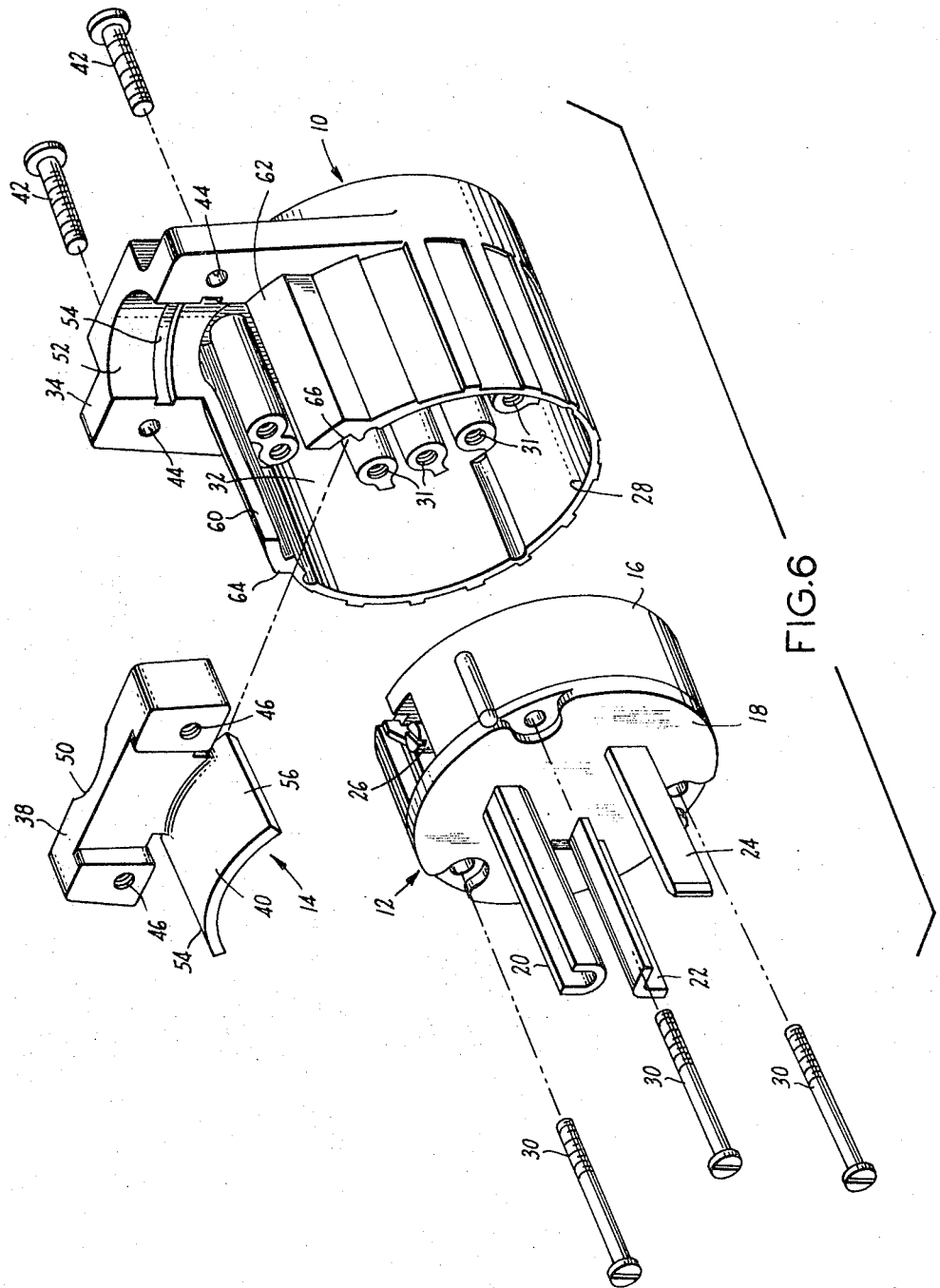
FIG. 6 is an exploded perspective view of the elements of the cap of the present invention.

Turning now particularly to FIG. 6 thtre is seen an exploded view of the elements of the cap of the present invention. These elemnts include a cover 10, an insulating body 12, and a closure element 14. Considering first the insulating body, this body has a generally cylindrical insulating housing 16 and the insulating face plate 18. Blades 20, 22, and 24 emerge from the openings in face plate 18 and wire connection to the blades is made by screw clamps 26 disposed about the insulator housing 16.

The generally cylindrical housing 12 is fitted into the generally circular opening 28 in cover 10 and is secured in place by threading the screws 30 into threaded screw holes such as 31.

Prior to the placement of the insulating body 12 into the conforming opening 28 in cover 10 the cable, including the individual wires which make up the cable, are connected to the wire clamps 26 in housing 16 and the cable itself extends out through side opening 32, near the visor shaped clamp member 34 of the cable clamp provided pursuant to this invention.

The clamp itself is made of two members, one being the visor 34 integrally formed with the cover 10 of the cap and the other being a conforming clamp 38 on the closure member 14.

The closure member 14 has an upper clamp element 38 and a lower curved wall portion 40 extending generally at right angle to the clamp element 38. Screw members 42 extend through the openings 44 and are threaded into threaded screw openings 46 in the clamp portion 38 of the closure member 14. By turning screws 42 high pressure can be developed on a clamp positioned between the semi-circular jaws 50 and 52 of the closure member 14 and visor 34 respectively of the cap. A groove 54 in the jaw increases the holding power of the clamp on a cable insulation when the cable insulation is forced into the groove by the tightening of the jaws together.

A greater inter-action of the closure member 14 and the cover 10 is achieved by providing a keyway in the cover 10 to cooperate with the edges 54 and 56 of the curved wall 40 of the closure. The keyway is made up by the runners or edge pieces 60 and 62 extending along the opening 32 in the side wall of the cover. These runners 60 and 62 are formed integrally with the walls of the cover and are spaced out from the circular portion of the wall by the steps 64 and 66 so that the curved wall portion 40 of the closure member 14 nests in the keyway and provides a continuation and completion of the circular wall 28 of the cover 10.

One feature of the present invention is that a tight conforming closure of the cover is achieved by the conformity of the curved wall of the closure member to the curved wall of the cover itself. These two curved wall portions cooperate with the insulating body 12 to provide a relatively tight closure about the enclosed electrical elements and reduce likelihood that any thin long object can be introduced to the cap interior and that electrical contact can thus be made through an opening between elements of the cap.

Further the closure provided adds strength to the cap itself by spreading any stress developed on the cable from the cable clamp, with its integral union with the cover, to the lower member 38 of the clamp and from this lower member to the cap through the side wall steps 64 and 66 and keyway 60 and 62.

The FIGS. 1 through 5 show other views of the cap as seen in exploded view in FIG. 6.

Figure 1:
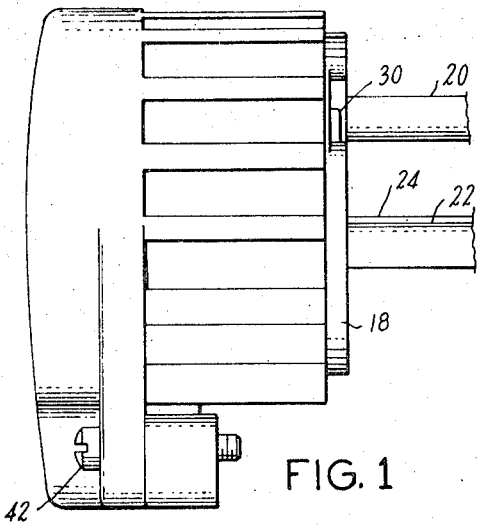
FIG. 1 is a side elevation of an insulating housing as provided by the present invention.
Figure 2:
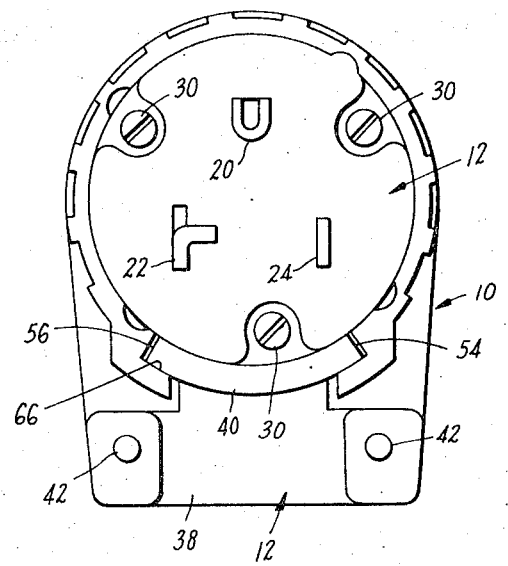
FIG. 2 is a front elevation of the insulating housing oF FIG. 1 showing blade contacts in place in the housing.
Figure 3:
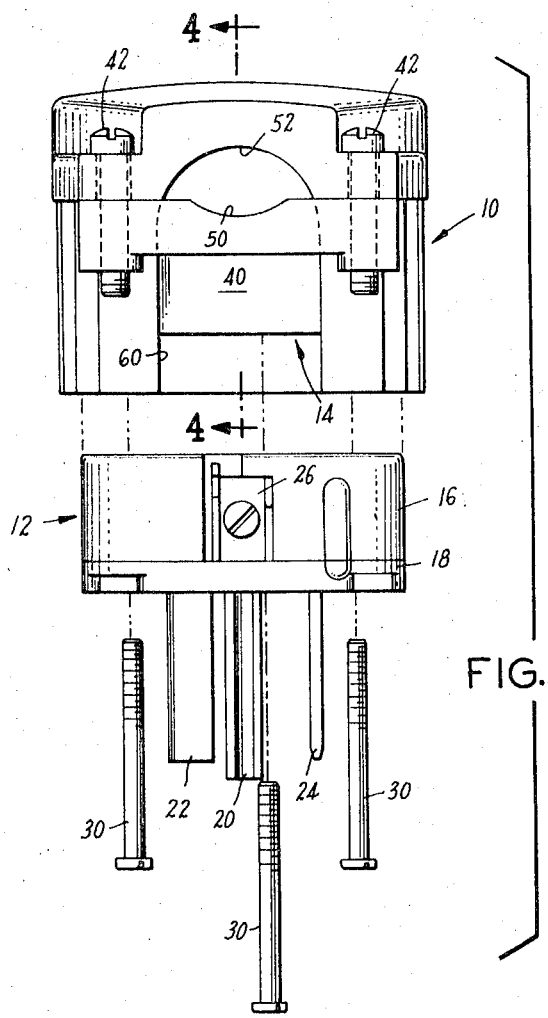
FIG. 3 is a rear elevational view of the cap of FIG. 2 with parts shown in an exploded disposition.
Figure 4:
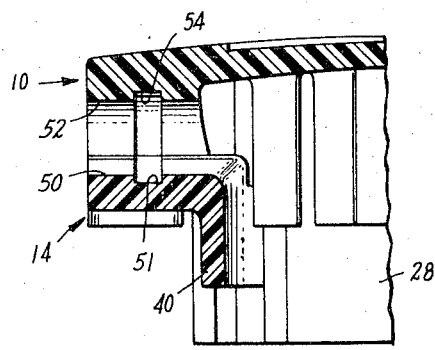
FIG. 4 is a sectional view taken along the lines 4—4 of FIG. 3 of a portion of the cap seen in the lower part of FIG. 1 but turned at 90°.

FIG. 1 shows the cap and clamp in side elevation with the blades omitted from the face plate 18. The clamp is in its fully closed position as is the case when a narrower cable is clamped therein. This fully closed positon is that seen in the rear elevation of FIG. 3 as well as the vertical section taken along the line 4—4 of FIG. 3.

Figure 5:
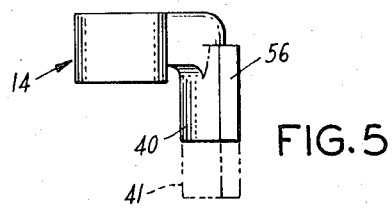
FIG. 5 is a side elevation of the closure and clamp element seen in section in FIG. 4.

In FIG. 5 a side elevation of two versions of the closure member is illustrated one in phantom. The version shown in solid lines is the shorter version which is used when larger cables are clamped in the cap. The longer version is the same as the shorter in all respects except that the curved wall section 40 is longer by a length of wall 40'. This longer version with its longer curved wall 40' is used where thinner cables are clamped in the cap.

Both the longer ans shorter versions have the edge 56 and 56' which nests within the runner 62 of the keyway of the cover 10.

Accordingly any tug or other force exerted on the cable which tends to urge closure 38 downward and outward as for example by a pivoting motion which would tend to bend the bottoms of screws 42 away from the hosuing 64 will be rsisted by the contact of edges 54 and 56 in the keyway of cover 10. In other words a force on a cable which would be effective to bend the screws 42 either toward or away from body 12 will be resisted and overcome either by a reinforcement generated by contact of the edges 54 and 56 in the keyway or by the contact of curved wall 40 with the similarly curved wall of body 12. Accordingly a uniquely strong and effective electrical angle plug or cap is provided pursuant to this invention. Other features of th cap are brought out in a U.S. Pat. application Ser. No. 167,390 filed July 29, 1971 and owned by the same assignee to which this application is assigned.

What is claimed is:

1. An angle cap comprising
a generally cylindrical insulating housing,
power terminAls having a wire attachment end and contact blade end,
the wire attachment end being mounted within said housing and the blades protruding through a face thereof,
a cover for said housing,
said cover being mounted to said housing by at least one attachment screw,
said cover having a side opening for entry of a cable and a visor-like side extension over said opening,
said visor having screw holes therein and an arched under surface forming the upper member of a cable clamp,
a closure element covering said side opening,
said closure element comprising a curved wall portion disposed to close said opening and a lower cable clamp element extending generally at right angles to said wall portion and having a trough and threaded screw holes therein adapted to cooperate with the arch and screw holes of said upper clamp to effectively clamp a cable therebetween,
keyway guide runners at the sides of the opening of said cover,
said keyway restraining outward movement of the curved wall portion of said closure.

* * * * *